United States Patent
Ji et al.

(10) Patent No.: US 9,310,896 B2
(45) Date of Patent: Apr. 12, 2016

(54) INPUT METHOD AND ELECTRONIC DEVICE USING PEN INPUT DEVICE

(71) Applicant: Samsung Electronics Co., Ltd., Gyeonggi-do (KR)

(72) Inventors: Daehyun Ji, Gyeonggi-do (KR); Joonwoo Kim, Gyeonggi-do (KR); Dongcheol Baek, Seoul (KR); Taekeun Oh, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 136 days.

(21) Appl. No.: 13/936,560

(22) Filed: Jul. 8, 2013

(65) Prior Publication Data

US 2014/0015811 A1    Jan. 16, 2014

(30) Foreign Application Priority Data

Jul. 11, 2012    (KR) .................. 10-2012-0075324

(51) Int. Cl.
  *G06F 3/033*    (2013.01)
  *G06F 3/0488*   (2013.01)
  *G06F 3/0354*   (2013.01)

(52) U.S. Cl.
  CPC ............ *G06F 3/033* (2013.01); *G06F 3/03545* (2013.01); *G06F 3/04883* (2013.01); *G06F 2203/04105* (2013.01)

(58) Field of Classification Search
  None
  See application file for complete search history.

(56) References Cited

U.S. PATENT DOCUMENTS

| | | | |
|---|---|---|---|
| 2002/0148655 A1 | 10/2002 | Cho et al. | |
| 2010/0044121 A1 | 2/2010 | Simon et al. | |
| 2010/0181121 A1* | 7/2010 | Tremblay | 178/19.01 |
| 2010/0182284 A1 | 7/2010 | Tremblay | |
| 2011/0273376 A1 | 11/2011 | Dickinson et al. | |
| 2012/0106782 A1* | 5/2012 | Nathan et al. | 382/103 |
| 2012/0127088 A1* | 5/2012 | Pance et al. | 345/173 |
| 2013/0009907 A1* | 1/2013 | Rosenberg et al. | 345/174 |
| 2013/0135220 A1* | 5/2013 | Alameh et al. | 345/173 |

FOREIGN PATENT DOCUMENTS

| | | |
|---|---|---|
| JP | 07-044316 A | 2/1995 |
| JP | 09-016311 A | 1/1997 |
| KR | 2002-0080171 A | 10/2002 |
| KR | 10-2005-0116041 A | 12/2005 |

* cited by examiner

*Primary Examiner* — Joseph Haley
*Assistant Examiner* — Emily Frank
(74) *Attorney, Agent, or Firm* — Cha & Reiter, LLC

(57) ABSTRACT

An input method and electronic device using a pen input device are provided. In an embodiment, status information of the pen input device is received, and contact information of a contact point between the pen input device and the terminal is generated, based on the received status information. Expressive effects of a pen input, such as line thickness, density and texture, are varied based on the contact information. Such input method and electronic device using the pen input device can simply and conveniently vary expressive effects of a pen-based input. In other embodiments, contact information is determined from actual contact points and expressive effects are varied as a function of the contact information or pen status information derived from the actual contact information.

7 Claims, 7 Drawing Sheets

(a)

(b)

INPUT METHOD AND ELECTRONIC DEVICE USING PEN INPUT DEVICE

CLAIM OF PRIORITY

This application claims the benefit under 35 U.S.C. §119(a) of a Korean patent application filed on Jul. 11, 2012 in the Korean Intellectual Property Office and assigned Serial No. 10-2012-0075324, the entire disclosure of which is hereby incorporated by reference.

BACKGROUND

1. Technical Field

The present disclosure relates generally to input technology for electronic devices using a pen input device.

2. Description of the Related Art

Today's hand held electronic devices such as smart phones, tablets computers, and the like, receive a user's input through various input methods and devices. In particular, the touch screen has become the predominant input mechanism in a majority of devices. Touch screen applications that have recently gained in popularity include handwriting and painting applications in which detection of a user's touch across the touch screen surface is converted to a writing or an image. In these applications, methods and devices for a touch input using a tool instead of the user's finger have been steadily researched and developed in order to allow a more delicate input.

Currently, sophisticated pen input devices which include communication and detection electronics have been proposed for use as a touch input tool. Various techniques have been attempted to measure three dimensional coordinates of these pen input devices by combining an acceleration sensor, an optical sensor, etc. within the pen input device. The coordinates are then used to express the thickness or pressure of a pen input on the basis of measurement results.

However, although there are various effects that can be actually expressed by a pen, it is difficult to vary such effects by simply using the location or tilt of a pen input device without any additional input through a user interface (UI), such as a selection of icons that automatically change a writing expression.

Further, a complex pen input device as mentioned above may often require many measuring units such as sensors equipped therein so as to freely vary expressive effects. This increase in complexity naturally increases the cost of the pen input device.

SUMMARY

An aspect of the present disclosure is to provide a method and electronic device for simply and conveniently varying expressive effects of a pen-based input using at least contact information of a contact point between the pen input device and the electronic device.

In an embodiment, an input method for an electronic device using a pen input device is provided. In the method, status information of the pen input device is received. Contact information of a contact point between the pen input device and the electronic device is generated, based on the received status information. Expressive effects of a pen input are varied, based on the contact information.

In another embodiment, an input method for an electronic device using a pen input device involves detecting a contact point defined by an area of contact between the pen input device and the electronic device. Contact information of the contact point is then generated. Status information of the pen input device is calculated, based on the contact information. Expressive effects of a pen input are varied, based on the status information.

An embodiment provides apparatus including an electronic device and a pen input device. The pen input device includes a communication unit configured to transmit and receive data to and from the electronic device. The electronic device includes a display unit configured to display expressive effects of a pen input; an input unit configured to receive an external input; a communication unit configured to transmit and receive data to and from the pen input device; and a control unit configured to vary the expressive effects of the pen input by using status information of the pen input device and contact information of a contact point between the pen input device and the electronic device.

Other aspects, advantages, and salient features of the invention will become apparent to those skilled in the art from the following detailed description, which, taken in conjunction with the annexed drawings, discloses exemplary embodiments of the invention.

DETAILED DESCRIPTION

Figure 1:
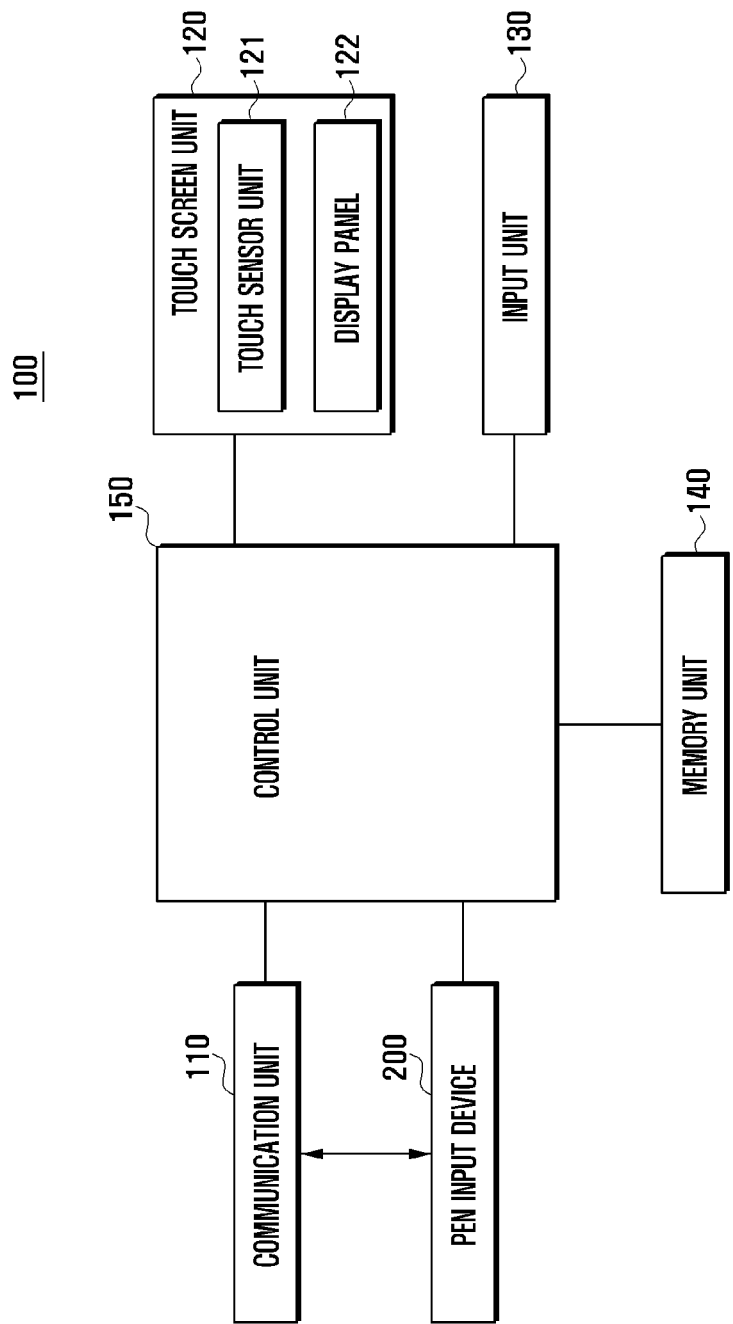
FIG. 1 is a block diagram illustrating the configuration of an electronic device in accordance with an embodiment of the present invention.

Exemplary embodiments of the present invention will be described below with reference to the accompanying drawings. The present invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

In this disclosure, "status information" may include all kinds of information detected at a sensor unit of a pen input device, especially, including one or more of three-dimensional coordinate information, tilt information, direction information, pressure information, and acceleration information of the pen input device.

In this disclosure, "tilt information" refers to information that indicates an amount of inclination of a pen input device with respect to a reference plane, and may be represented as angles, three-dimensional coordinates, or the like. The value of such a tilt may be expressed differently depending on what plane is defined as a reference plane. Namely, if a reference plane is set to the surface of a touch screen, a pen input device perpendicular to the touch screen is considered to have a tilt of 0 degrees. However, a reference plane or line can be set differently, e.g., as an axis or plane normal to the touch screen surface, or as a plane set at an arbitrary angle with respect to the surface. A reference plane may be set in advance by a user or have a default value set by the terminal itself.

In this disclosure, "contact information" is information about a contact point, especially, including one or more of coordinates, size, shape, and pressure of the contact point. A "contact point" is the general location at which contact is made between a touch implement (e.g., a pen input device) and a touch surface of the electronic device, and can be defined by an area of contact or coordinates of an area of contact.

In this disclosure, "reference size information" refers to the size of a contact point when there is an input of a pen input device by predefined criteria. Similarly, reference shape information refers to the shape of a contact point when there is an input of a pen input device by predefined criteria. Here, an input of a pen input device by predefined criteria means any input in the case where the pen input device is placed in a state having specific status information such as predefined three-dimensional coordinates, tilt, direction, pressure, acceleration, and the like.

In this disclosure, "expressive effects" refers to information displayed on a display unit in response to a detection signal created by an input of a pen input device, especially, including one or more of thickness, density, and texture of a pen input. An example of such expressive effects is shown in FIG. 3.

Figure 3:
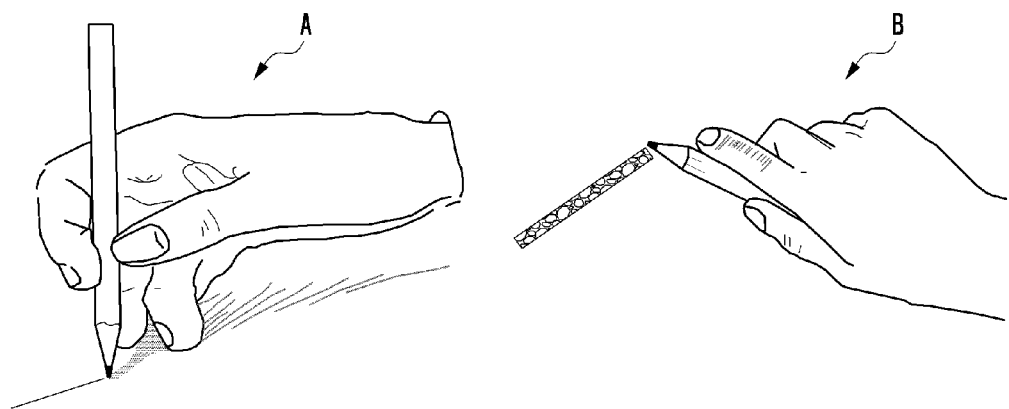
FIG. 3 illustrates two examples of expressing various effects by using a real pencil, to illustrate concepts of the present disclosure.

Referring to FIG. 3, principles of the present disclosure are illustrated with the use of two examples of expressing various effects with the use of a real pencil. When a line is drawn with a pencil held upright, as in illustration A, expressive effects are thin, deep and dense. However, when a line is drawn with a pencil substantially tilted and nearly on its side as in illustration B, expressive effects are thick, light and rough.

Examples of electronic devices suitable for use in embodiments of this invention include a mobile communication terminal, a personal digital assistant (PDA), a smart phone, a navigation device, a digital broadcasting receiver, a portable multimedia player (PMP), an MP3 player, a personal computer (PC), a laptop computer, a tablet PC, and any other electronic device capable of using a pen input device.

FIG. 1 is a block diagram illustrating the configuration of an electronic device, 100, in accordance with an embodiment of the present invention. Device 100 includes a communication unit 110, a touch screen unit 120, an input unit 130, a memory unit 140, and a control unit 150.

The communication unit 110 can be any suitable kind of wired/wireless communication unit and performs a transmission/reception function of data through a communication with a pen input device 200 (hereafter, "pen" 200, interchangeably). In the case where the device 100 is wirelessly connected with the pen 200, the communication unit 110 is an RF (radio frequency) unit and may be composed of an RF transmitter that up-converts the frequency of an outgoing signal and then amplifies the signal, an RF receiver that amplifies with low-noise an incoming signal and down-converts the frequency of the signal, and the like. Also, a short-range communication module based on RFID, NFC (near field communication), Bluetooth, UWB (ultra wideband), Zigbee, IrDA (infrared data association), or the like may be further used.

In a case where the device 100 has a wired connection with the pen input device 200, the communication unit 110 can act as just a wired interface for signal communication between the control unit 150 and the pen 200. Alternatively, the communication unit 110 can be omitted if the pen 200 is wired directly to the control unit 150 to implement all communication therebetween.

In embodiments of the present invention, the communication unit 110 may receive, from the pen 200, status information of the pen input device and/or contact information generated in the pen input device.

The touch screen unit 120 includes a touch sensor unit 121 and a display unit 122. The touch sensor unit 121 is an element that detects user's touch input. Although it is described herein that the touch sensor unit 121 is a part of the touch screen unit 120, the touch sensor unit 121 may be alternatively included in the input unit 130 to be described below. The touch sensor unit 121 may be a touch detection sensor of capacitive overlay type or resistive overlay type or any other kind of sensor device capable of detecting a contact of an object. The touch sensor unit 121 detects a touch input from a user, creates a detection signal, and sends the created signal to the control unit 150. The terminal 100 may output information, corresponding to the detection signal received by the control unit 150, on the display unit 122.

Further, the touch sensor unit 121 may receive a manipulation signal caused by a touch input from a user using any touch implement. A touch implement can be a user's finger, a simple stylus pen, or a more sophisticated mechanical/electronic tool such as the pen input device 200 which may include a control button to execute specific operations known in the related art.

In the present invention, the touch sensor unit 121 may detect a touch input of the pen input device 200, generate a detection signal, and transmit the generated signal to the control unit 150.

The display unit 122 may be formed of LCD (liquid crystal display), OLED (organic light emitting diodes), AMOLED (active matrix OLED), or any other equivalent. The display unit 122 visually presents, to users, data stored in the device 100 or received by the device 100.

In this invention, the display unit 122 may display information corresponding to a detection signal caused by a touch input of the pen 200, and also vary and display expressive effects of the pen 200 input under the control of the control unit 150.

The input unit 130 can be an input device formed at any location other than the touch screen unit 120 in device 100. Like the touch sensor unit 121, the input unit 130 generates an input signal and delivers it to the control unit 150. Also, the input unit 130 may detect the occurrence of inputs occurring independently or sequentially, their continuance, and their termination. Although it is described herein that the input unit 130 is formed at any location other than the touch screen unit 120, the touch sensor unit 121 may be considered part of the input unit 130 as discussed above.

The input unit 130 may include a key input unit, which may be formed of a keypad having alphanumeric keys and navigation keys or formed of individual keys. Also, the key input unit may be formed of a button type or a touch sensor type.

Additionally, the input unit 130 may include a proximity sensor (not shown). In this case, the input unit 130 may detect the existence, approach, movement, direction, speed, shape, etc. of any object from a detection surface without any mechanical contact by detecting a force of an electromagnetic field. The proximity sensor may use one of a transmission type photoelectric sensor, a direct reflection type photoelectric sensor, a mirror reflection type photoelectric sensor, a high-frequency oscillation type proximity sensor, a capacitive type proximity sensor, a magnetic type proximity sensor, and an infrared proximity sensor. Meanwhile, the input unit 130 may use an electromagnetic resonance (EMR) pad to replace the touch sensor unit 121 and the proximity sensor.

In an embodiment of this invention, device 100 may receive all touch-based inputs by means of the touch screen unit 120, in which case the input unit 130 can be omitted. Meanwhile, input unit 130 may be configured to receive non-touch input commands and information signals, e.g., voice commands, and/or commands and information signals received from external devices wirelessly or through a wireless connection. (In the latter case, the input unit 130 can be considered to include the communication unit 110 configured for this purpose, or another communication unit so configured, not shown.) However, if device 100 has any proximity sensor, the input unit 130 may detect an input of the pen 200 through the proximity sensor, generate a corresponding detection signal, and send it to the control unit 150.

The memory unit 140 is an element that stores programs and data required for the operation of the device 100 and may store an operating system (OS) of the device 100, various applications, and data such as images, audio recordings and videos. The memory unit 140 may be divided into a program region and a data region. The program region may store programs and the OS for controlling the general operation of the device 100, applications required for playing multimedia contents, applications required for any other optional functions such as a sound play function or an image or video view function, and the like. The data region may store data produced during use of device 100, such as images, videos, a phonebook, audio data, and the like.

The memory unit 140 may include any of a variety of types of storage media such as flash memory type memory, hard disk type memory, multimedia card micro type memory, card type memory (e.g., SD or XD memory, etc.), RAM (random access memory), SRAM (static random access memory), ROM (read-only memory), EEPROM (electrically erasable programmable ROM), PROM (programmable ROM), magnetic memory, magnetic disk, optical disk, and the like.

In this invention, the memory unit 140 may store reference information such as reference plane information, reference size information, reference shape information, and the like, and may also store measured and/or calculated tilt information, contact information, and the like received from the control unit 150.

The control unit 150 is an element that controls the general operation of the electronic device 100.

In this invention, the control unit 150 may control the display unit 122 to vary expressive effects of a pen 200 input by using at least one of status information of the pen 200 and contact information of a contact point between the pen 200 and the device 100.

In a first embodiment of the present invention, the control unit 150 receives status information of the pen 200 through the communication unit 110. This status information may include three-dimensional coordinate information, tilt information, direction information, pressure information, and acceleration information of the pen 200, which is measured using sensors within the pen 200. Based on the received status information, the control unit 150 creates contact information of a contact point between the pen input device 200 and device 100. This contact information may include one or more of coordinates, size, shape, and pressure of the contact point. The contact information is then used by control unit 150 to generate expressions of lines across the display as the pen 200 moves across the touch screen.

When the pen 200 is situated in a certain relationship with respect to the touch sensor unit 121 surface, for example, has a certain tilt, the size or shape of a contact point between the pen 200 and the touch sensor unit 121 may be determined. Therefore, based on status information of the pen 200, contact information of a contact point may be computed and then used as a basis to generate expressions of drawing lines. A relevant example of this mechanism is shown in FIG. 6.

Figure 6:
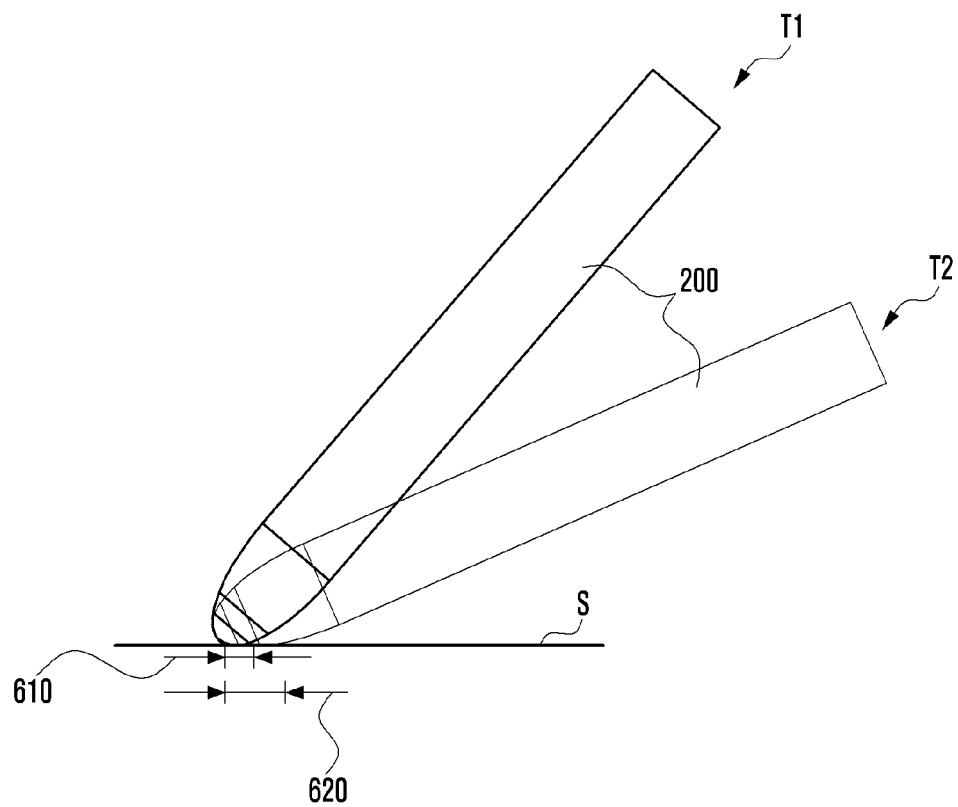
FIG. 6 illustrates variation of contact information depending on tilt information in embodiments of the present invention.
Figure 6:
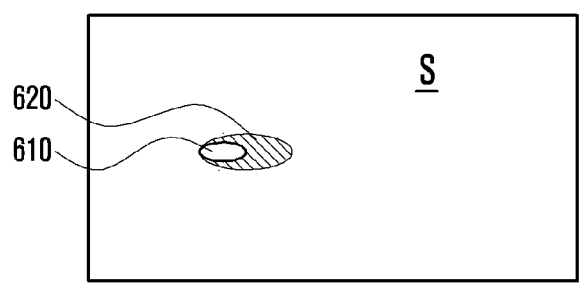

FIG. 6 illustrates variation of contact information depending on tilt information of a pen input device in embodiments of the present invention. In FIG. 6, the size and shape of a contact point are varied according to the tilt of the pen 200. Let's suppose that a reference plane is set as a surface S of the touch screen unit 120 to be contacted by the pen 200. When pen 200 is in a generally upright position, i.e., at a first tilt position T1 with respect to S, the area or length 610 of a contact point becomes smaller and the shape resembles a circle. On the contrary, when the pen 200 is more tilted and lies at a second tilt position T2, the area or length 620 of a contact point becomes greater and the shape resembles an ellipse. Therefore, as the tilt of the pen 200 decreases, namely, the tilt approaches 0 degrees (full upright position), a contact point has a smaller size and resembles a circle in shape. In contrast, as the pen 200 tilt increases, a contact point has a greater size and resembles an ellipse in shape. It is noted, the tilt of the pen 200 can be defined with a different convention if a different reference plane is used, such as a plane normal to the surface of the touch screen.

It should be noted, the pen 200 may be designed with a spherical shaped tip and a cylindrical body, and may have a conically shaped transition between the spherical tip and the cylindrical body. In other designs, the end of the tip is flat, and the remainder of the tip is conical, spherical or ellipsoid. Further, the tip may be flexible, producing different contact area with applied pressure. Thus, a relationship between the shape and size of the contact point (i.e., the area of contact) and the tilt/applied pressure of the pen 200 with respect to the contact surface, can be calculated and stored within device 100 based on information of the physical characteristics of the pen 200.

The control unit 150 may control the display unit 122 to vary expressive effects of a pen input, based on contact information. Expressive effects may include one or more of thickness, density, and texture of a pen input. When a contact point is smaller in size and resembles a circle in shape, the control unit 150 may vary expressive effects to have thin, deep and dense effects. When a contact point is greater in size and resembles an ellipse in shape, the control unit 150 may vary expressive effects to have thick, light and rough effects.

The control unit 150 may vary expressive effects in n stages by using n−1 reference values for contact information. For example, in order to produce expressive effects at three stages, the control unit 150 establishes two reference values a and b (a<b). Namely, expressive effects may be differently shown at three stage where a specific value of contact information is smaller than a reference value a, is between two reference values a and b, and is greater than a reference value b.

This process may also be performed at a step of generating contact information from status information of the pen 200. Namely, when contact information is created, n−1 reference values are established for the pen input device 200, and contact information is classified into n stages. Thereafter, depending on contact information of n stages, expressive effects may be varied with n stages.

As discussed above, in the first embodiment, the control unit 150 may calculate contact information through status information of the pen input device 200 and thereby simply and conveniently vary expressive effects without receiving actual contact information.

In a second embodiment of the present invention, the control unit 150 detects a contact point (where "point" encompasses an area of contact) between the pen input device 200 and the device 100 through the touch sensor unit 121 and then generates contact information of the contact point corresponding to the detected coordinates included within the area of the contact point. This contact information may include one or more of coordinates, size, shape, and pressure of the contact point.

Based on the created contact information, the control unit 150 may calculate status information of the pen input device. This status information of the pen input device may include three-dimensional coordinate information, tilt information, direction information, pressure information, and acceleration information.

When the contact point has a certain size or shape, the status of the pen input device 200 may be determined. Therefore, based on contact information, status information of the pen input device may be created. A related example is shown in FIG. 7.

Figure 7:
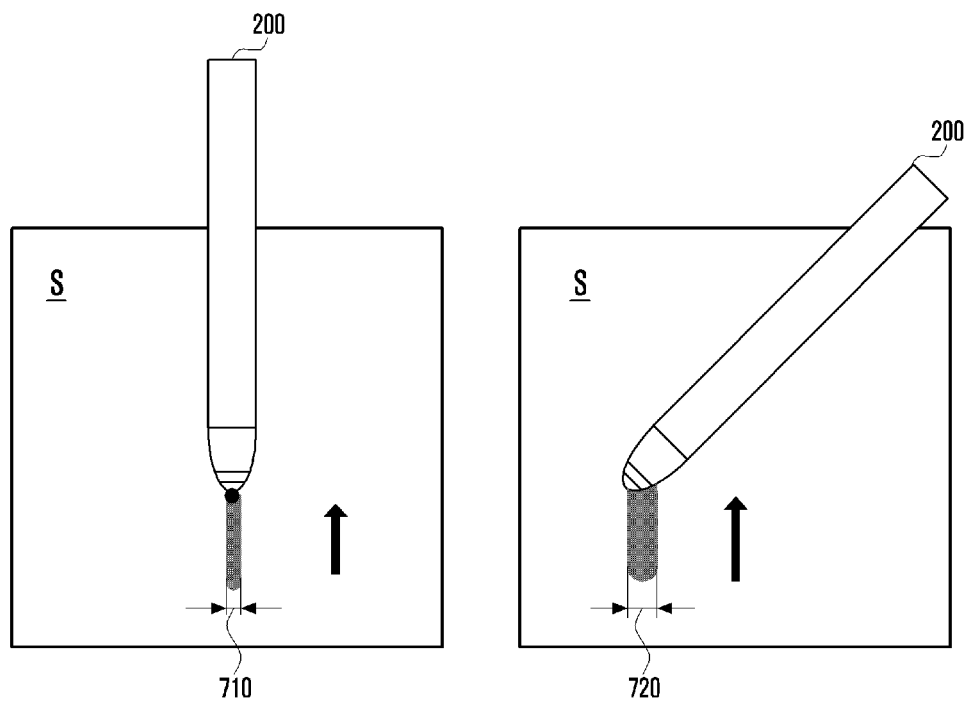
FIG. 7 illustrates variation of tilt information depending on contact information in embodiments of the present invention.

FIG. 7 illustrates variation of tilt information depending on contact information in embodiments of the present invention. Here, the tilt of the pen input device 200 is varied according to the size of a contact point between the pen input device 200 and the electronic device 100.

The relationship between tilt and contact point area and shape is similar or identical to that described earlier in connection with FIG. 6. Let's suppose that a reference plane is set to the surface of the touch screen unit 120 to be contacted by the pen input device. As indicated by a reference numeral 710, when a contact point has a smaller size, this corresponds to a smaller tilt of the pen 200. On the contrary, when a contact point has a greater size as indicated by a reference numeral 720, this corresponds to a larger pen tilt. Different reference planes and tilt conventions can be used in the alternative.

When calculating status information, the control unit 150 may compare contact information with at least one of reference size information and reference shape information and then, based on comparison results, calculate status information.

Reference size information and reference shape information may be stored in the memory unit 140 in the form of database by calculating in advance status information of the pen input device corresponding to a specific size and a specific shape of a contact point. Namely, the memory unit 140 may store in advance reference size information and reference shape information in a case where there is an input of the pen 200 by predefined criteria. Then, in order to obtain status information, the control unit 150 may calculate the tilt of the pen 200 by comparing the measured contact information with the stored reference size information or reference shape information.

Such database of reference size information and reference shape information may be constructed by a user or stored as initial setting of the terminal 100.

Additionally, the control unit 150 may control the display unit 122 to vary expressive effects of a pen input, based on the generated status information. Expressive effects may include one or more of thickness, density, and texture of a pen input. Expressive effects may be varied as a function of pen tilt or contact information, and optionally in stages, in the same manner as described above.

It should be noted, in an embodiment variation, control unit 150 may control display unit 122 to vary expressive effects of a pen input based on the measured contact information, without computing any pen status information.

This staging process described earlier may also be performed at a step of creating status information of the pen input device from contact information. Namely, n−1 reference values can be established for reference size information or reference shape information, and status information is classified into n stages. Thereafter, depending on status information of n stages, expressive effects may be varied with n stages.

Additionally, when the pen 200 detects a contact point and creates contact information, the control unit 150 may receive the contact information through the pen 200. Namely, the control unit 150 may receive contact information of a contact point from the pen 200 rather than detect and create contact information through the touch sensor unit 121. In this implementation, pen 200 includes a suitable means of detecting contact at detectable points along its surface.

As discussed above, in the second embodiment, the control unit 150 may calculate status information of the pen input device through contact information and thereby simply and conveniently vary expressive effects without receiving tilt information from the pen 200 itself. In this embodiment, the pen 200 can advantageously be made less complex and at a reduced cost by omitting sensors otherwise employed to measure the pen's tilt, acceleration, etc.

Figure 2:
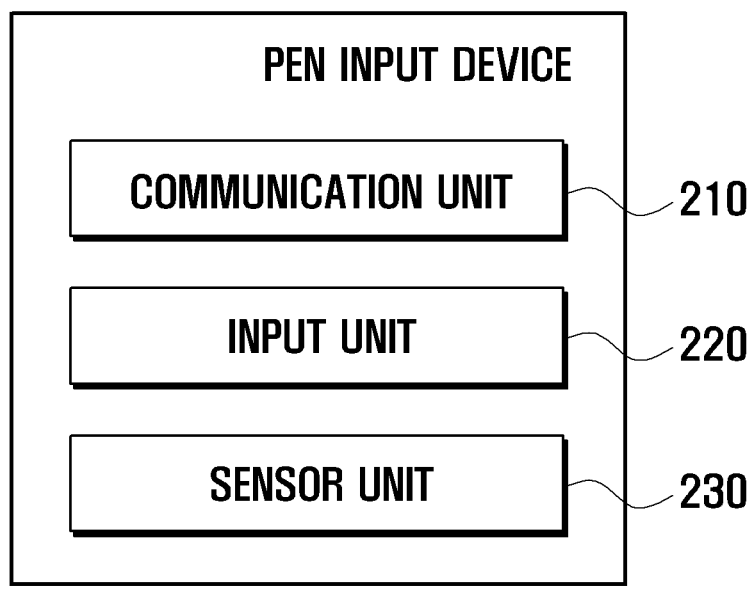
FIG. 2 is a block diagram illustrating the configuration of a pen input device in accordance with an embodiment of the present invention.

FIG. 2 is a block diagram illustrating the configuration of a pen input device 200 in accordance with an embodiment of the present invention. The pen input device 200 includes a communication unit 210, an input unit 220, and a sensor unit 230.

The communication unit 210 can be any suitable type of wired/wireless communication unit and performs a transmission/reception function of data through a communication with the above-discussed electronic device 100. In the case where the device 100 is wirelessly connected with the pen 200, the communication unit 210 is an RF unit and may be composed of an RF transmitter that up-converts the frequency of an outgoing signal and then amplifies the signal, an RF receiver that amplifies with low-noise an incoming signal and down-converts the frequency of the signal, and the like. Also, a short-range communication module based on RFID, NFC (near field communication), Bluetooth, UWB (ultra wideband), Zigbee, IrDA (infrared data association), or the like may be further used.

In a case where the device 100 is in direct wired connection with the pen input device 200, any structure connecting the terminal 100 and the pen input device 200, rather than a separate module, may embody the communication unit 210. Namely, if a signal of the pen input device 200 is directly transmitted to the control unit 150 of the terminal 100 through wire, the input unit 220 or the sensor unit 230 may be considered as the communication unit 210.

In certain embodiments of the present invention, the communication unit 210 may transmit, to the terminal, status information of the pen 200 and/or contact information generated in the pen 200.

The input unit 220, which is an input device formed at the pen input device, generates an input signal and delivers it to the device 100 through the communication unit 210. Also, the input unit 220 may detect the occurrence of inputs occurring independently or sequentially, their continuance, and their termination. The input unit 220 may be a key input unit. For instance, a user depresses the key to command execution of a predetermined operation.

The sensor unit 230 can be any type of device for detecting status information of the pen input device. The sensor unit 230 may be formed of a three-axis acceleration sensor, a tilt sensor, a pressure sensor, a proximity sensor, and the like.

If the sensor unit 230 is formed of a proximity sensor, it may detect the existence, approach, movement, direction, speed, shape, etc. of any object from a detection surface without any mechanical contact by using a force of an electromagnetic field. The proximity sensor may use one of a transmission type photoelectric sensor, a direct reflection type photoelectric sensor, a mirror reflection type photoelectric sensor, a high-frequency oscillation type proximity sensor, a capacitive type proximity sensor, a magnetic type proximity sensor, and an infrared proximity sensor.

The sensor unit 230 may operate as the input unit 220. In certain embodiments of the present invention, the sensor unit 230 may detect status information of the pen input device and then transmit a detection signal to the terminal 100.

Figure 4:
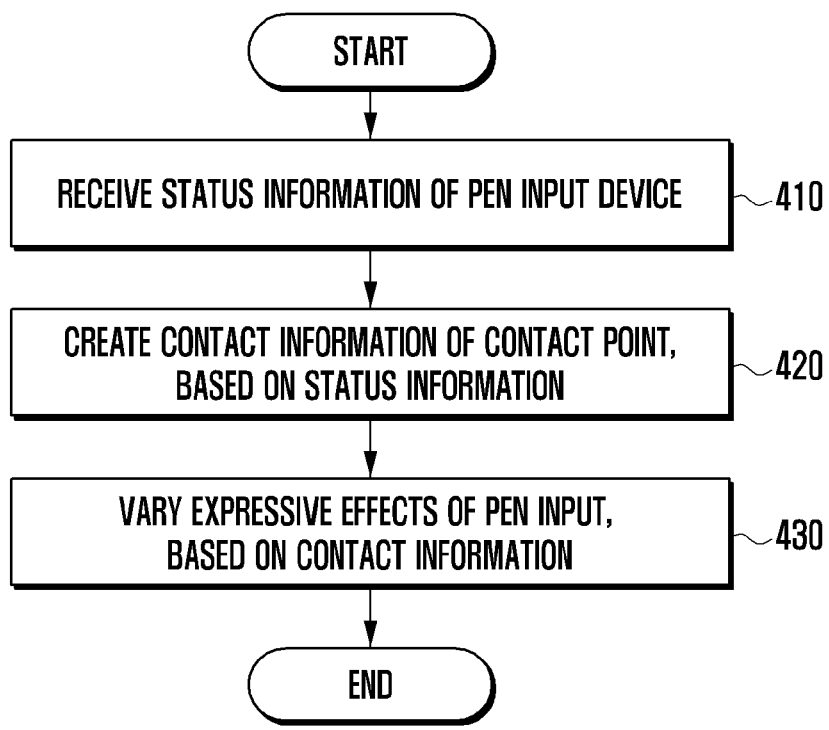
FIG. 4 is a flow diagram illustrating an input method for an electronic device using a pen input device in accordance with the first embodiment of the present invention.

FIG. 4 is a flow diagram illustrating an input method for an electronic device 100 using a pen input device 200 in accordance with the first embodiment of the present invention.

First, the control unit 150 receives status information of the pen input device 200 through the communication unit 110 (step 410). This the status information may include three-dimensional coordinate information, tilt information, direction information, pressure information, and acceleration information of the pen input device 200.

Next, based on the received status information, the control unit 150 creates contact information of a contact point between the pen input device 200 and the terminal 100 (step 420). Here, the contact information may include one or more of coordinates, size, shape, and pressure of the contact point.

When the pen input device 200 has a certain positional status, for example, has a certain tilt, the size or shape of a contact point between the pen input device 200 and the touch sensor unit 121 may be determined. Therefore, based on status information of the pen input device 200, contact information of a contact point may be generated. A related example of a relationship between tilt and contact information has been shown and described in connection with FIG. 6 hereinabove.

Next, the control unit 150 controls the display unit 122 to vary expressive effects of the pen 200 input, based on the contact information (step 430). Expressive effects may include one or more of thickness, density, and texture of a pen input.

When a contact point is smaller in size and resembles a circle in shape, the control unit 150 may set expressive effects to have thin, deep and dense effects. When a contact point is greater in size and resembles an ellipse in shape, the control unit 150 may set expressive effects to have thick, light and rough effects. The expressive effects may be varied in n stages by using n−1 reference values for contact information in the manner described earlier.

This process may also be performed at step of creating contact information from status information of the pen input device 200. Namely, when contact information is created, n−1 reference values are established for the pen input device 200, and contact information is classified into n stages. Thereafter, depending on contact information of n stages, expressive effects may be varied with n stages.

As discussed above, in the first embodiment, the input method of the device 100 may calculate contact information through status information of the pen input device 200 and thereby simply and conveniently vary expressive effects without receiving real contact information.

Figure 5:
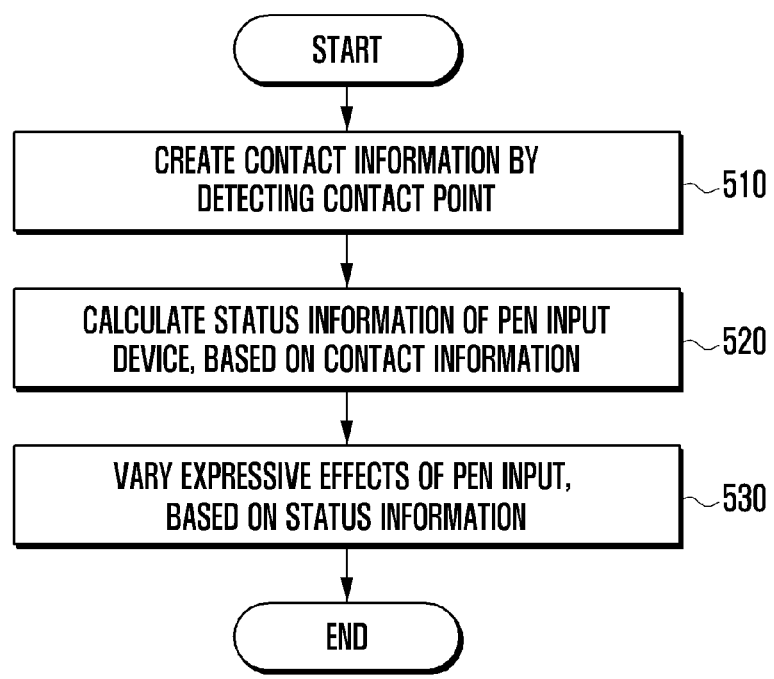
FIG. 5 is a flow diagram illustrating an input method for an electronic device using a pen input device in accordance with the second embodiment of the present invention.

FIG. 5 is a flow diagram illustrating an input method for a terminal 100 using a pen input device 200 in accordance with the second embodiment of the present invention.

First, the control unit 150 detects a contact point between the pen input device 200 and the electronic device 100 through the touch sensor unit 121 and then creates contact information of the contact point (step 510). Here, the contact information may include one or more of coordinates, size, shape, and pressure of the contact point.

Next, based on the created contact information, the control unit 150 calculates status information of the pen 200 (step 520). This status information of pen 200 may include three-dimensional coordinate information, tilt information, direction information, pressure information, and acceleration information.

When the contact point has a certain size or shape, the positional status of the pen input device 200 may be determined. Therefore, based on contact information, status information of the pen input device may be generated. A related example of this operation has been shown in FIG. 7 and described earlier.

When calculating status information, the control unit 150 may compare contact information with at least one of reference size information and reference shape information and then, based on comparison results, calculate status information.

Reference size information and reference shape information may be stored in the memory unit 140 in the form of database by calculating in advance status information of the pen input device 200 corresponding to a specific size and a specific shape of a contact point. Namely, the memory unit 140 may store in advance reference size information and reference shape information in case where there is an input of the pen input device 200 by predefined criteria. Then, in order to obtain status information, the control unit 150 may calculate the tilt of the pen input device by comparing the measured contact information with the stored reference size information or reference shape information.

Such database of reference size information and reference shape information may be constructed by a user or stored as initial setting of the terminal 100.

Additionally, the control unit 150 may control the display unit 122 to vary expressive effects of a pen input, based on the created status information (step 530). Expressive effects may include one or more of thickness, density, and texture of a pen input.

As described above, expressive effects may be set to have thin, deep and dense effects when the pen input device 200 is more upright (less tilt), and to have thick, light and rough effects when the pen input device 200 is more tilted. Expressive effects can be also varied in n stages in the manner described earlier. Further, the staging approach may also be performed at a step of creating status information of the pen input device 200 from contact information. Namely, n−1 reference values are established for reference size information or reference shape information, and status information is classified into n stages. Thereafter, depending on status information of n stages, expressive effects may be varied with n stages.

Additionally, when the pen 200 detects a contact point and creates contact information, the control unit 150 may receive the contact information through the pen 200. Namely, the control unit 150 may receive contact information of a contact point from the pen input device rather than detect and create contact information through the touch sensor unit 121 of the device 100.

As discussed above, in the second embodiment, the input method of the terminal may calculate status information of the pen input device 200 through contact information and thereby simply and conveniently vary expressive effects without receiving tilt information of the pen input device 200. Furthermore, expressive effects may be derived from measured contact information alone, without calculating status information, whereby the pen input device may be simplified.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An input method for an electronic device, which includes a touchscreen surface, using a pen input device, the method comprising:
   receiving status information of the pen input device;
   generating contact information of an actual contact point between the pen input device and the electronic device in which the pen input device is in contact with the touchscreen surface, based on the received status information; and
   varying expressive effects of a pen input, based on the contact information,
   wherein the expressive effects are determined from the actual contact point between the pen input device and the touch screen surface and stored reference information,
   wherein contact information includes a size and a shape of the contact point, and
   wherein the status information includes tilt information of the pen input device, the tilt information being determined from at least the size and the shape of the actual contact point and the stored reference information.

2. The method of claim 1, wherein the contact information includes both a size and a shape of the contact point, the size increases as a function of tilt, and the shape changes from generally circular at a generally upright position of the pen input device with respect to a surface of the electronic device to an oval shape as the tilt with respect to a touch surface of the electronic device increases.

3. An input method for an electronic device using a pen input device, the method comprising:
   detecting a contact point defined by an area of contact between the pen input device and the electronic device;
   generating contact information of the contact point; and
   varying expressive effects of a pen input, based on the contact information,
   wherein the contact information includes at least one of the size and shape of the contact point, and
   wherein when the pen input device is tilted, tilt information of the pen input device is determined from the contact information.

4. The method of claim 3, wherein the contact information includes at least one of the size and shape of the contact point.

5. The method of claim 4, wherein density of displayed lines is varied as a function of size and shape of the contact point.

6. The method of claim 4, wherein texture of displayed lines is varied as a function of size and shape of the contact point.

7. The method of claim 4, wherein thickness of displayed lines is varied as a function of size and shape of the contact point.

* * * * *